S. SALTO.
APPARATUS FOR CONCENTRATING AND PROJECTING RADIANT ENERGY.
APPLICATION FILED JAN. 8, 1916.

1,278,026.

Patented Sept. 3, 1918.

Inventor-
Salvatore Salto
By B. Singer Atty.

UNITED STATES PATENT OFFICE.

SALVATORE SALTO, OF MILAN ITALY.

APPARATUS FOR CONCENTRATING AND PROJECTING RADIANT ENERGY.

1,278,026.  Specification of Letters Patent.  Patented Sept. 3, 1918.

Application filed January 8, 1916. Serial No. 71,070.

*To all whom it may concern:*

Be it known that I, SALVATORE SALTO, engineer, subject of the King of Italy, residing at Milan, Italy, have invented certain new and useful Improvements in or Relating to Apparatus for Concentrating and Projecting Radiant Energy, of which the following is a specification.

This invention relates to an apparatus for the concentration of light, heat and electric rays, and for the projection of the said rays in the desired manner.

The apparatus for concentrating and directing or guiding light rays, has for its purpose to illuminate objects by concentrating light rays thereon by means of reflectors with elliptical curvature, while other reflecting surfaces may be used to project the said rays out of the apparatus.

In the accompanying drawing given by way of example, Figures 1–5 illustrate diagrammatically various constructions according to the invention.

Figure 1:
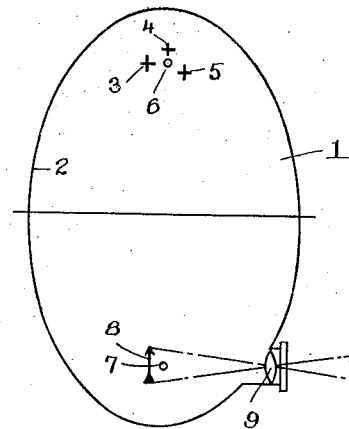

According to the construction shown in Fig. 1, in the interior of a hollow ellipsoid 1, of which 2 is the inner reflecting surface, is placed one or more sources of light 3, 4, 5. In one or the other of the foci 6, 7, of the ellipsoid, the luminous intensity reaches a maximum, and it is here that an object, for instance 8, can be strongly lighted, and can also be observed directly or projected on a screen 10 by means of a suitable device 9, for instance a microscope or a magnifying lens.

Figure 2:
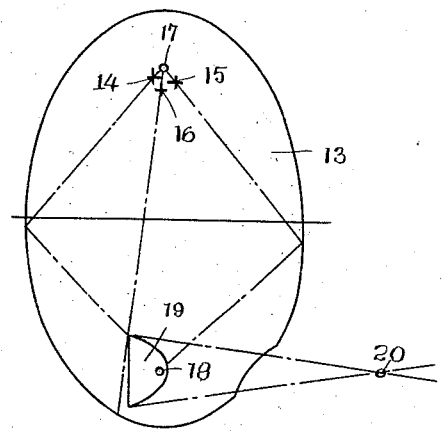

Fig. 2 shows a construction intended to light articles arranged outside the apparatus. In the interior of a hollow reflecting ellipsoid 13 are arranged sources of light 14, 15, 16. The rays concentrated in the focus 18, are projected outside the apparatus by means of a mirror 19. The mirror may be curved, flat, parabolic, hyperbolic, elliptical, spherical, etc., according to the purpose for which the apparatus is intended, and to the beam that is desired to obtain. For instance, by arranging in the apparatus shown in Fig. 2, a hyperbolic mirror so that its focus coincides at 18 with that of the ellipsoid, the luminous rays will be reflected to the point 20 which represents the other focus of the hyperboloid.

Figure 3:
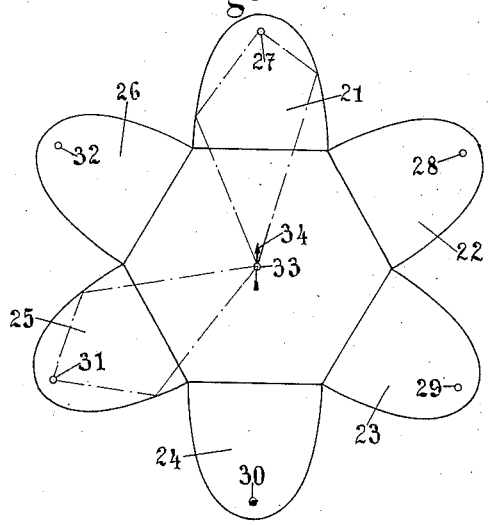

In Fig. 3, two or more reflecting surfaces 21, 22, 23, 24, 25, 26 are arranged so as to obtain at 33 a common focus, the sources of energy being arranged in the other foci 27, 28, 29, 30, 31, 32 of the elliptical mirrors. The radiations emitted by the said sources of light or heat, are reflected by the elliptical surfaces to the neighborhood of the common focus 33, and it is here that will be obtained light or heat of great intensity. The less extensive are the sources of luminous or heat energy, the greater will be the specific heating or lighting at the common focus 33. In order to light or heat a body 34, it will be sufficient to bring it near the point 33 where the luminous or heat energy reaches its maximum.

Figure 4:
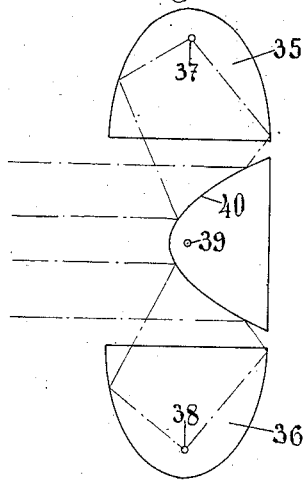

Fig. 4 shows a projector intended to project outside the apparatus radiations concentrated by means of elliptical mirrors. Two or more elliptical surfaces 35 and 36 are arranged so as to have at 39 a common focus; the sources of light are placed in the other foci 37, 38 of the elliptical mirrors, so that their radiations are concentrated at 39. Another mirror 40 having a curvature suitable for the purpose of the apparatus is intended to project radiations received from the elliptical mirrors. The mirror 40 may have a parabolic, hyperbolic, elliptical, spherical, or any other curvature, according to the use for which the apparatus is intended. If, for instance, the mirror 40 has a parabolic curvature, with the focus at 39, the radiations from the elliptical mirrors will be reflected by the parabolic mirror in a more or less parallel beam, according to the extension of the sources of energy and according to the precision with which they come to a focus at 39.

The new technical effect obtained by means of this apparatus, consists in the possibility of obtaining high specific luminous or caloric intensities, by concentrating emanations from several sources of energy, and enabling them to be projected. An apparatus of this kind may be used as a marine search-light or as a coast light, or as a projector for cinematographic purposes, headlight for motor cars etc. When heat radiations are employed, the apparatus could be used either for heating bodies situated near the common focus of concentration, or for projecting heat emanations against the said bodies.

Figure 5:
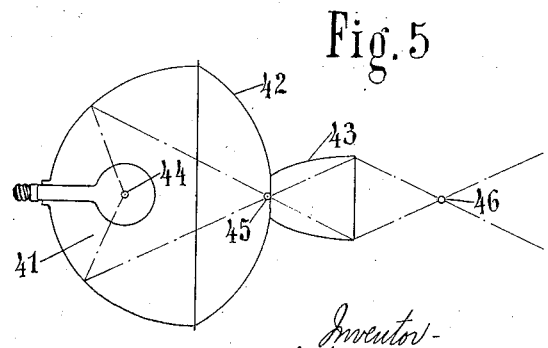

Fig. 5 shows a construction of a light projector with a single source of energy. The mirror 41 with elliptical curvature has one of its foci at 44, and the other at 45. The glass 42 with spherical curvature has its center of curvature at 44. The radiations emitted by the source of light arranged at 44, are reflected by the elliptical mirror to the focus 45, to which point are also brought, after two reflections (by the spherical mirror and by the elliptical mirror) the radiations from the luminous source which reach the mirror 42. Another mirror 43 which, according to the purpose of the apparatus, may have a parabolic, hyperbolic, spherical or elliptical curvature, receives the radiations passing close to the focus 45, and reflects them outside the apparatus. In the construction illustrated, the mirror 43' has an elliptical curvature with one of the foci at 45 and the other at 46, so that the radiations from the source situated at 44 are concentrated, after reflection, at the point 46. An apparatus of this kind can be utilized for cinematographic projections where it is required to illuminate brilliantly a small surface of the film, and where the bundle of rays must form a cone with the sharpest possible angle, in order that all the rays, after traversing the film, should pass through the projecting lens. By using a reflector of this type instead of the condenser with ordinary lenses, it is possible materially to reduce the intensity of the source of light, since the efficiency of the reflector is greater than that of the lens condenser, and it is thus possible to replace the arc lamp, at present generally used in cinematography, by a suitable incandescent lamp which has advantages over the arc lamp from the point of view of simplicity of upkeep as well as from the point of view of safety from the fire of the film, and uniformity of strength of the light.

In order to concentrate or to project heat rays on any object, apparatus similar to those just described could be used, with the only difference that the sources of light would be replaced by sources of heat. Apparatus of such kind could be utilized for medical purposes, for heating objects or for any other suitable purpose.

When it is required to concentrate and direct or guide electric rays, the apparatus must be made of a material which is a good conductor of electricity, so as to obtain in the interior of the apparatus reflections analogous to those of light rays. Apparatus of this kind could be utilized as transmitters for wireless telegraphy or telephony, or for transmitting to a distance electric energy. Of course, electric oscillators would be used in the interior of the apparatus.

What I claim is:

A projector for radiant energy, comprising an elliptical mirror, a source of energy arranged in one focus of said mirror, a spherical mirror, the center of the curvature of which is located in said focus, and another reflecting surface for receiving the reflected radiations and for projecting the same toward the outside.

In testimony whereof I have affixed my signature in presence of two witnesses.

SALVATORE SALTO.

Witnesses:
ALBERTO PERI,
ILO C. FUNK.